(12) United States Patent
Laeuffer (10) Patent No.: US 7,824,306 B2
(45) Date of Patent: Nov. 2, 2010

(54) POWER TRANSMISSION DEVICE FOR A MOTOR VEHICLE AND METHOD FOR USING SAID DEVICE

(75) Inventor: Jacques Laeuffer, Paris (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 784 days.

(21) Appl. No.: 11/575,381

(22) PCT Filed: Sep. 8, 2005

(86) PCT No.: PCT/FR2005/050723

§ 371 (c)(1),
(2), (4) Date: Mar. 15, 2007

(87) PCT Pub. No.: WO2006/030150

PCT Pub. Date: Mar. 23, 2006

(65) Prior Publication Data

US 2007/0284179 A1    Dec. 13, 2007

(30) Foreign Application Priority Data

Sep. 15, 2004    (FR) .................................. 04 52051

(51) Int. Cl.
*B60K 1/02*    (2006.01)
(52) U.S. Cl. ......................................................... 477/3
(58) Field of Classification Search ...................... 477/3, 477/5, 7, 8; 475/5
See application file for complete search history.

(56) References Cited

U.S. PATENT DOCUMENTS

| | | | |
|---|---|---|---|
| 4,019,586 A | 4/1977 | Hauser | |
| 5,571,058 A | 11/1996 | Schmidt et al. | |
| 5,637,987 A | 6/1997 | Fattic et al. | |
| 6,161,640 A | 12/2000 | Yamaguchi et al. | |
| 7,195,573 B2* | 3/2007 | Bezian et al. | 475/5 |
| 7,276,008 B2* | 10/2007 | Yasui et al. | 475/5 |
| 7,458,910 B2* | 12/2008 | Besnard et al. | 475/5 |
| 2004/0235613 A1* | 11/2004 | Aoki et al. | 477/3 |
| 2008/0176695 A1* | 7/2008 | Janson et al. | 475/5 |
| 2008/0194369 A1* | 8/2008 | Boutou et al. | 475/5 |
| 2008/0227576 A1* | 9/2008 | Besnard et al. | 475/5 |

(Continued)

FOREIGN PATENT DOCUMENTS

DE    19606771 A1    8/1997

(Continued)

OTHER PUBLICATIONS

International Search Report mailed Apr. 18, 2006 in PCT/FR2005/050723.

*Primary Examiner*—Ha D. Ho
(74) *Attorney, Agent, or Firm*—Nicholas E. Seckel (57) ABSTRACT

The invention mainly relates to a power transmission device (1) between an internal combustion engine (2) and vehicle wheels (3) consisting of a pair of electrical machines (4.1, 4.2) and a mechanical assembly (90), wherein said assembly (90) comprises at least two epycycloidal trains (5, 9) each of which is provided with three mutually engageable elements. According to said invention, a switching device (23.1) comprises means (23, 28) for simultaneously connecting the machine shaft (11) to two other elements (11.1, 11.2) of the mechanical assembly (90) during switching between two operating modes of the transmission device (1).

16 Claims, 5 Drawing Sheets

U.S. PATENT DOCUMENTS

2008/0234087 A1* 9/2008 Besnard et al. ................ 475/5

FOREIGN PATENT DOCUMENTS

| EP | 0780256 | A | 6/1997 |
| EP | 1097830 | A | 5/2001 |
| FR | 2783764 | A | 3/2000 |
| WO | WO 03/043846 | * | 5/2003 |

* cited by examiner

Fig. 2a    ETAT DE LA TECHNIQUE

POWER TRANSMISSION DEVICE FOR A MOTOR VEHICLE AND METHOD FOR USING SAID DEVICE

The present invention concerns a power transmission device for a motor vehicle. A goal of the invention is in particular to suppress torque interruptions or reductions that can appear during changes in the driving conditions. The invention can be advantageously applied to the field of motor vehicles, but it could also be used with other types of vehicles, such as motorcycles or boats.

Transmission gears are known for hybrid vehicles that comprise a heat engine, one, two, or several epicycloidal gear trains and two electrical machines. An example of such a transmission gear is described in the French patent application FR-A-2832357. With these transmission gears, the power of the heat engine can be, either transmitted directly to the wheels, or derived by passing through an electrical chain. The electrical chain comprises the electrical machines capable of behaving as a motor or as a generator depending on the energy values received electrically and or mechanically on their terminals and their shaft, respectively. The derived power is re-transmitted to the wheels of the vehicle or stored, as the case may be, in a storage system. This derived power makes it possible to adapt precisely the torque applied to the wheels of the vehicle to that requested by a driver while adapting also precisely the torque and speed of the heat engine so as to optimize its output. This adaptation of the torque applied to the wheels provides a better driving comfort, while the adaptation of the operation point of the heat engine enables energy savings.

Figure 1A:
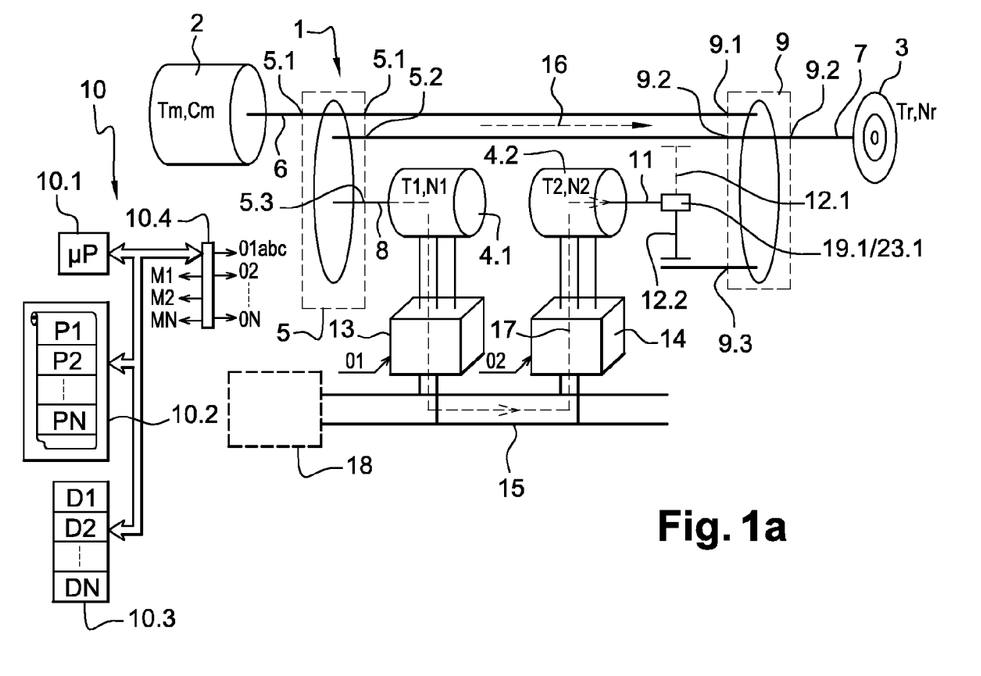
FIG. 1*a* (already described in part): a schematic view of a power transmission gear.

Thus, FIG. 1a shows an example of a power transmission gear 1 between a heat engine 2 and vehicle wheels 3. This transmission gear 1 includes a first electrical machine 4.1 and a second electrical machine 4.2, as well as a first epicycloidal gear train 5 and a second epicycloidal gear train 9. The epicycloidal gear trains 5 and 6 include each a first, a second, and a third element. An element of these gear trains can be either a sun gear or a planet carrier or a ring gear.

These three elements mesh with each other. As a variant, each gear train includes more than three elements. For example, each gear train could include a ring gear with outside teeth that would mesh with a fourth element. In another example, an epicycloidal gear train could comprise several planet carriers.

A first element 5.1 of the first gear train 5 is connected to the heat engine 2 and to a first element 9.1 of the second gear train 9. A second element 5.2 of the first gear train 5 is connected to a second element 9.2 of the second gear train 9 which is in direct engagement with the shaft 7 of the wheels 3. A third element 5.3 of the first gear train 5 is connected to a shaft 8 of the first machine 4.1. As will be seen, a shaft 11 of the second machine 4.2 is connected, either to this second gear train element 9.2 in a first operating mode of the vehicle, or to a third element 9.3 of the second gear train 9 in a second operating mode of the vehicle. A switching device 23.1 ensures the passage from a coupling of the shaft 11 with the second element 9.2 to a coupling of the shaft 11 with the third element 9.3, and reciprocally.

Figure 1B:
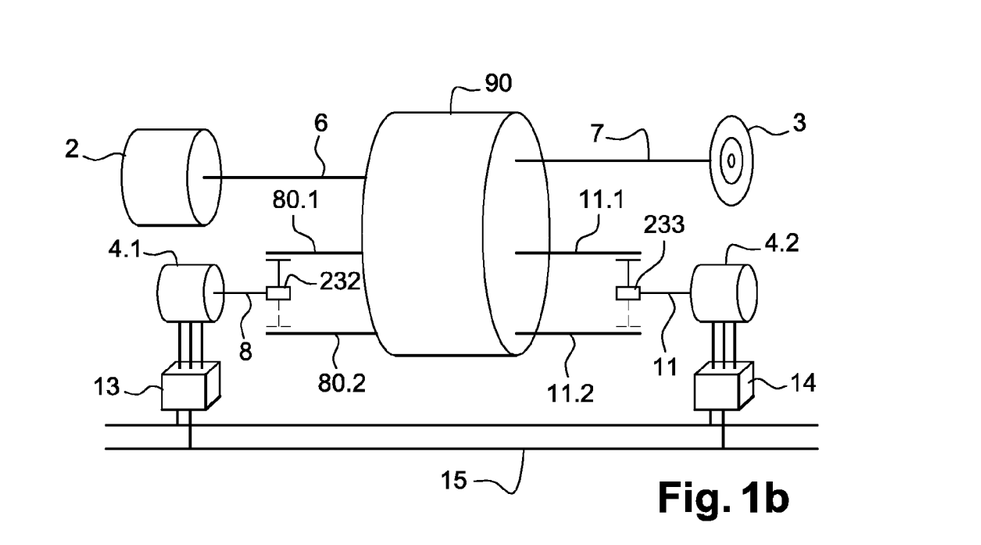
FIG. 1*b* (already described in part): a schematic view of a more general power transmission gear.

FIG. 1b shows in a more general way a power transmission gear 1 between a heat engine 2 and vehicle wheels 3. This transmission gear 1 comprises a first electrical machine 4.1 and a second electrical machine 4.2, as well as a mechanical assembly 90 including at least two epicycloidal gear trains. In an example, this mechanical assembly 90 includes in particular epicycloidal gear trains. In some embodiments, the epicycloidal gear trains can be connected to each other via gear shafts and pinions.

As will be seen, a shaft 8 of the first machine 4.1 is connected, either to an element 80.1 of the mechanical assembly 90 in an operating mode of the vehicle, or to another element 80.2 of the mechanical assembly 90 in another operating mode of the vehicle. A first switching device 232 ensures the passage from a coupling of the shaft 8 with the element 80.1 to a coupling of the shaft 8 with the element 80.2, and reciprocally.

As will also be seen, a shaft 11 of the second machine 4.2 is connected, either to an element 12.1 of the mechanical assembly 90 in an operating mode of the vehicle, or to another element 12.2 of the mechanical assembly 90 in another operating mode of the vehicle. A second switching device 233 ensures the passage from a coupling of the shaft 11 with the element 11.1 to a coupling of the shaft 11 with the element 11.2, and reciprocally.

In the general case, either shaft of the transmission device 1 can pass from a coupling of one element with another of the group 90, via a switching device. Indeed, in the general case, the shaft 8 or 11 of one of the machines 4.1 or 4.2, the shaft 6 of the engine 2, or the shaft 7 of the wheels 3 are capable of being connected to various elements of the mechanical group 90. Each time a new switching device is introduced in the group 90, two new operating modes are introduced. For m switching devices, there are thus 2^m different operating modes. Only the most interesting ones from an energetic point of view will be kept to operate the transmission device.

In the case where a direct current system is used, two inverters 13 and 14 connect the first and the second machines 4.1, 4.2, respectively, to a direct tension bus 15. Thus, the power stemming from the heat engine 2 can be transmitted directly to the wheels along a mechanical chain 15 comprising in particular the epicycloidal gear trains 5 and 9. But this power can also be transmitted to the wheels 3 of the vehicle along an electrical chain 17 comprising the machines 4.1 and 4.2 and the inverters 13 and 14. These machines 4.1 and 4.2 can then operate, either as motors, or as generators.

For an operation of one of these machines as a motor, the inverters 13 and 14 ensure the transformation of a direct tension signal observable on the bus 15 into alternative tension signals supplying coils of the machine. For an operation of one of the machines as a generator, the inverters 13 and 14 ensure the transformation of the alternative tension signals observable on the phases of the machine into a direct tension signal. In the cases where an energy storage system is not used, when one of the machines 4.1 or 4.2 operates as an motor, the other machine operates as a generator. Indeed, the sum of the powers consumed or supplied by the machines 4.1 and 4.2 must be equal to zero. This equality is valid only in the case where the transmission gear 1 does not comprise an energy storage system.

As a variant, an energy storage system 18, such as a battery, is connected to the direct tension bus 15. The power that is derived toward the machines 4.1 and 4.2 can be transmitted to this system 18. This storage system 18 authorizes additional operating levels. To this aim, the electrical machines 4.1 and 4.2 can operate, either both as motors, or both as generators. In particular, during a slowdown phase of the vehicle, one of the machines 4.1 or 4.2 at least behaves as a generator in order to transmit power to the storage system 18.

In a particular embodiment, the machines 4.1 and 4.2 are machines of the synchronous type. These machines have the benefit of being compact and having a good output.

Such a transmission gear 1 makes it possible to obtain a multitude of transmission ratios and to limit the consumption of the heat engine 2. To this effect, for a given power, the rotation speed of the heat engine 2 is limited. By adapting rotation speeds of the electrical machines, all the transmission ratios can be applied between the heat engine 2 and the wheels 3. In addition, such a transmission gear does not comprise a clutch that would dissipate energy. The consumption of the engine 2 is thus reduced by about 40% as compared to a consumption of this same engine 2 used with a standard gear box.

To limit even more a consumption of the engine 2 and in particular to limit an energy dissipated by the electrical chain 17, the transmission gear 1 shifts from the first to the second operating mode, and reciprocally. More precisely, an object of these two modes is to limit the power dissipated by the second machine 4.2, by limiting its rotation speed.

To this aim, in the case of FIG. 1a, when the rotation speed of the shaft 7 of the wheels 3 is less than that of the shaft 6 of the engine 2, the transmission gear 1 shifts to the first operating mode. The shaft 11 of the second machine 4.2 is then connected to the second element 9.2 of the second gear train via a first gear 12.1. This first embodiment corresponds to short speed ratios.

When the rotation speed of the shaft 6 of the engine is less than the rotation speed of the shaft 7 of the wheels 3, the transmission gear 1 shifts to the second operating mode. The shaft 11 of the second machine 4.2 is then connected to the third element 9.3 of the second gear train 9 via a second gear 12.2. This second operating mode corresponds to long transmission ratios.

In the two operating modes, the machines 4.1 and 4.2 can behave, either as motors, or as generators.

In the case of FIG. 1a, as in the case of FIG. 1b, Nm, Nr, N1, and N2 are defined as being reduced rotation speeds of the shaft 6 of the engine 2, of the shaft 7 of the wheels 3, of the shaft 8 of the first machine 4.1, and of the shaft 11 of the second machine 4.2. These speeds are reduced rotation speeds because they correspond to the actual rotation speeds multiplied by constant coefficients.

Tm, Tr, T1, and T2 are defined as being reduced torques applied to the shaft 6 of the engine 2, to the shaft 7 of the wheels 3, to the shaft 8 of the first machine 4.1, and to the shaft 11 of the second machine 4.2, respectively. These torques are reduced torques because they correspond to the actual torques multiplied by constant coefficients.

In a general manner, for a power derivation transmission with two operating modes, the following equations can be established:

$$Nr=Nm+N1 \quad (1)$$

$$Tr=Tm+T2 \quad (2)$$

In the first operating mode, the following equations can be established:

$$Nr=N2 \quad (3)$$

$$Tm=T1 \quad (4)$$

In the second operating mode, the following equations can be established:

$$Nr=N2+G.N1 \quad (5)$$

$$Tm=T1-G.T2 \quad (6)$$

G being a constant coefficient corresponding to gear ratios of the gear trains and to gear ratios of the transmission device.

At the switching from one mode to another, the following equations can be established:

$$N1=0 \quad (7)$$

$$Nm=Nr=0 \quad (8) \text{ and}$$

$$T2=0 \quad (9)$$

$$Tm=Tr=1 \quad (10)$$

For more simplicity, in the rest of the document, the reduced torque will be called torque, and the reduced rotation speed will be called rotation speed.

To perform a switching from one mode to another, it is preferable to apply no torque to the gears 12.1 and 12.2 in order to avoid torque jerks at the wheel and to minimize the dimensioning of the mechanical switching parts. The power of an electrical machine is equal by definition to its torque multiplied by its rotation speed. The first machine 4.1 has thus a rotation speed N1 of zero during the switching, as indicated in equation (7). No power is then dissipated in the electrical chain 17 and the power dissipated by the second machine 4.2 is thus zero. Since this second machine 4.2 has a rotation speed that is not equal to zero, the torque T2 that is applied to its shaft is zero. A switching can then occur in good conditions.

Figure 2A:
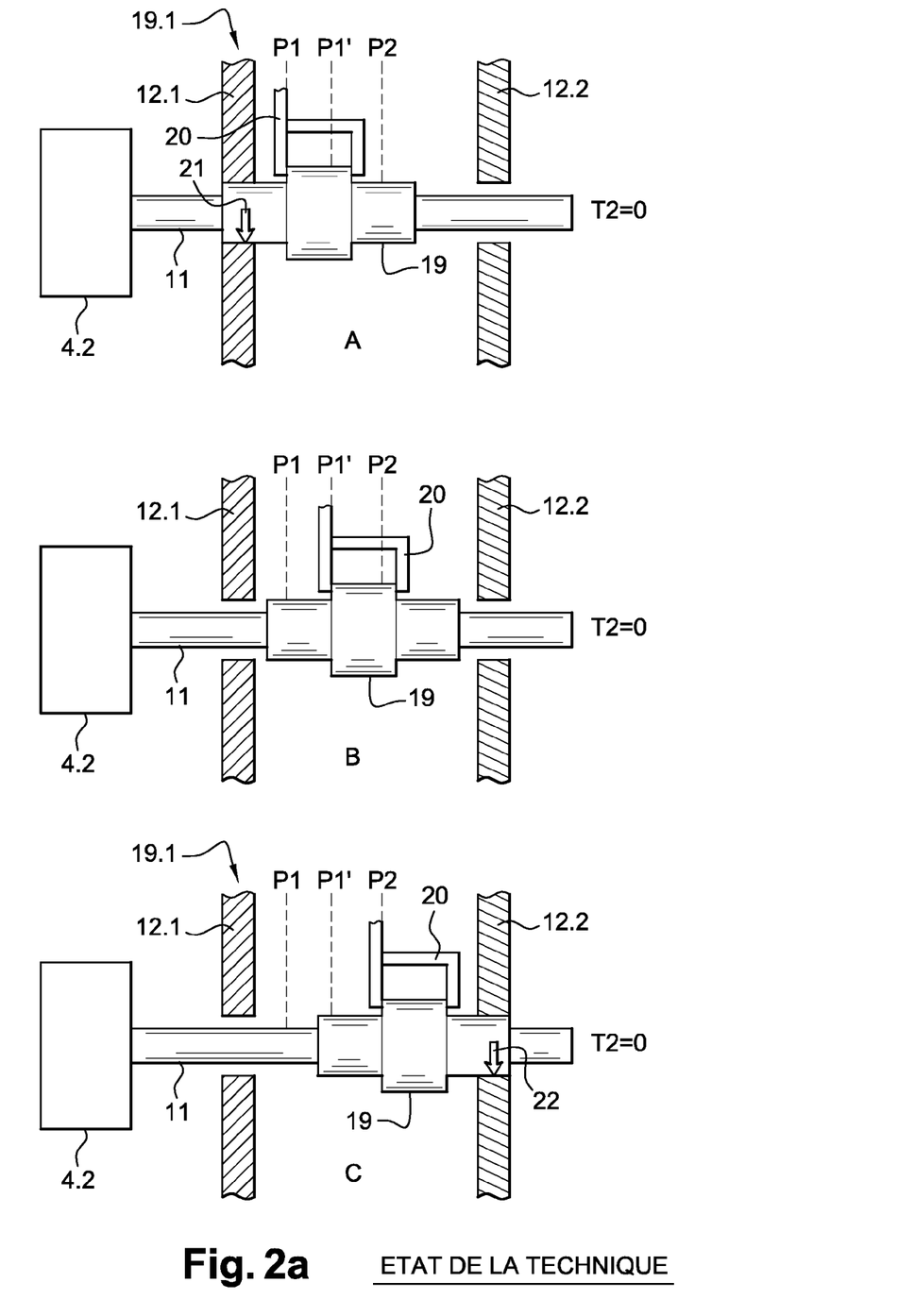
FIG. 2*a* (already described): a schematic view of switching steps from one mode to another with switching devices according to the invention.

FIG. 2a shows switching steps from one mode to another performed with a switching device 19.1 of the state of the art. During these steps, the switching device 19.1 switches from the first to the second operating modes. Thus, on this Figure, the shaft 11 of the second machine 4.2 shifts from a coupling with the gear 12.1 to a coupling with the gear 12.2.

This switching device 19.1 has a sliding sleeve 19 and a fork 20. The sliding sleeve 19 can move in translation along the shaft 11. The fork 20 makes it possible to move this sliding sleeve 19 from a first position P1 toward a second position P2 and reciprocally. To this effect, the fork 20 is supported on two shoulders of the sliding sleeve 19.

As seen above, during this switching, the first machine 4.1 has a rotation speed N1 equal to zero, so that the torque T2 applied to the shaft 11 of the machine 4.2 is zero.

In a first step A, the sliding sleeve 19 is in a first position P1. The sliding sleeve 19 then cooperates with the first gear 12.1 connected to the second element 9.2 of the second gear train 9. This sliding sleeve 19 is then supported on this gear 12.1.

In a second step B, the fork 20 moves the sliding sleeve 19 into an intermediary position P1'. During this movement, the sliding sleeve 19 becomes disengaged from the first gear 12.1. This movement is performed without a problem since no torque T2 is applied to the shaft 11. At the end of this second step B, the sliding sleeve 19 is disengaged from the two gears 12.1 and 12.2.

Finally, in a third step C, the fork 20 moves the sliding sleeve 19 into a second position P2. During this movement, the sliding sleeve 19 penetrates into the inside of the second gear 12.2. This engagement of the sliding sleeve 19 is performed without effort, here also, since the torque applied to the shaft 11 is zero. The sliding sleeve 19 is then in engagement with this second gear 12.2.

The movement of the sliding sleeve 19 is made possible by the fact that the gear ratios used in the transmission gear 1 and the gear ratios of the epicycloidal gear trains 5 and 9 are selected in order to ensure a synchronism between the rotation speeds of the shaft 11 and of the gears 12.1 and 12.2. More precisely, these ratios and these gear ratios are selected so that the rotation speed of the shaft 11 is equal to the rotation speed of the first and of the second gear 12.1, 12.2 when the rotation speed of the first machine 4.1 is zero.

However, in practice, this switching does not actually occur with zero torque. Indeed, during this switching, it is necessary to produce a power into the electrical chain 17 corresponding at least to the energy losses of the two machines 4.1 and 4.2. The first electrical machine 4.1 cannot provide this power since it is stopped. Thus, only the second machine 4.2 can supply these energy losses. In the first and third steps A and C, low torques 21 and 22 can be applied to the shaft 11. These torques 21 and 22 make it possible for the second machine 4.2, which is in rotation, to produce a power corresponding to the losses of the machines 4.1 and 4.2.

In contrast, in the second step B, no torque can be applied to the shaft 11 of the second machine 4.2. Indeed, during this second step, the sliding sleeve 20 is driven, neither by the first, nor by the second gear 12.1, 12.2. This lack of driving can generate a slowdown of the machines. The second machine 4.2 remains in rotation for a short time because of its inertia. Indeed, this rotation triggers flux variations and thus a passage of current in its coils. This passage of current generates in particular non-negligible ohmic losses that end up slowing the machine markedly.

Further, in the case where the storage system 18 is connected to the bus 15 and where the second machine 4.2 operates as a generator, a torque interruption can occur during the switching. This torque interruption can occur during the second step B where the shaft 11 of the second machine 4.2 is no longer engaged with the gears 12.1 and 12.2. Indeed, when the second machine 4.2 operates as a generator, a non-negligible torque is applied to its shaft 11. The equation (1) indicates that the torque Tr applied to the shaft 7 of the wheels corresponds to the sum of the torque Tm applied to the shaft 6 of the heat engine 2 and the torque T2 applied to the shaft 11 of the second machine 4.2. For a constant torque Tm applied to the shaft 6 of the heat engine 2, a switching would thus trigger a torque interruption unpleasant for the driver of the vehicle.

The invention proposes to solve in particular this problem of the production of power corresponding to the losses of the machines during a switching, as well as this problem of torque interruption.

To this aim, in the invention, a sliding sleeve is used that enables a progressive switching between a first position where the shaft of the second machine is engaged with the shaft of the wheels and a second position where the shaft of the second machine is engaged with an element of the second epicycloidal gear train. In particular, during this switching, the sliding sleeve ensures, at a given time, a simultaneous connection between the shaft of the second machine, the wheel shaft, and an element of the second epicycloidal gear train. In the invention, the forces on the shaft of the second machine are distributed so that the passage from one mode to another is not performed in the best conditions possible.

Thus, there is always a torque applied to the shaft of the second machine. This application of a torque makes it possible to produce a power corresponding to the losses of the machines and to ensure a fluid and comfortable driving, without torque interruption.

Thus, the present invention concerns a power transmission device between a heat engine and the wheels of a motor vehicle, this device having:
- a first and a second electrical machine, and
- a mechanical group connecting with each other a shaft of the engine, a shaft of the wheels, and shafts of the electrical machines, this mechanical group having
  - at least two epicycloidal gear trains, each epicycloidal gear train having several element mutually meshing with gear shafts, and
  - at least one switching device ensuring, by displacement, a selective connection of one of the shafts to a first element or to a second element of the mechanical group to which this shaft is capable of being connected, characterized in that
the switching device comprises means for simultaneously ensuring a connection between the selectively connected shaft and the two elements of the mechanical group, during a displacement of this switching device.

Further, the invention concerns a method of using a power transmission device between a heat engine and wheels of a motor vehicle, this power transmission device comprising a first and a second electrical machine, a switching device, and a mechanical group connecting with each other a shaft of the engine, a shaft of the wheels, and shafts of the electrical machines, this mechanical group comprising at least two epicycloidal gear trains, each gear train comprising several elements mutually meshing with gear shafts, comprising,
  in a first operating mode, connecting the shaft of a machine to an element of the mechanical group with help of the sliding sleeve of the switching device,
  in a second operating mode, connecting the shaft of this same machine to another element of the mechanical group with the help of the sliding sleeve,
characterized by,
  if the machine does not operate as a motor during the passage from one mode to another, applying a torque to the shaft of the other machine to compensate the presence of a parasitic torque on this shaft.

The invention will be better understood by reading the following description and examining the accompanying Figures. These Figures are given by way of example but without any limitation of the invention in any way. These Figures show.

Figure 2B:
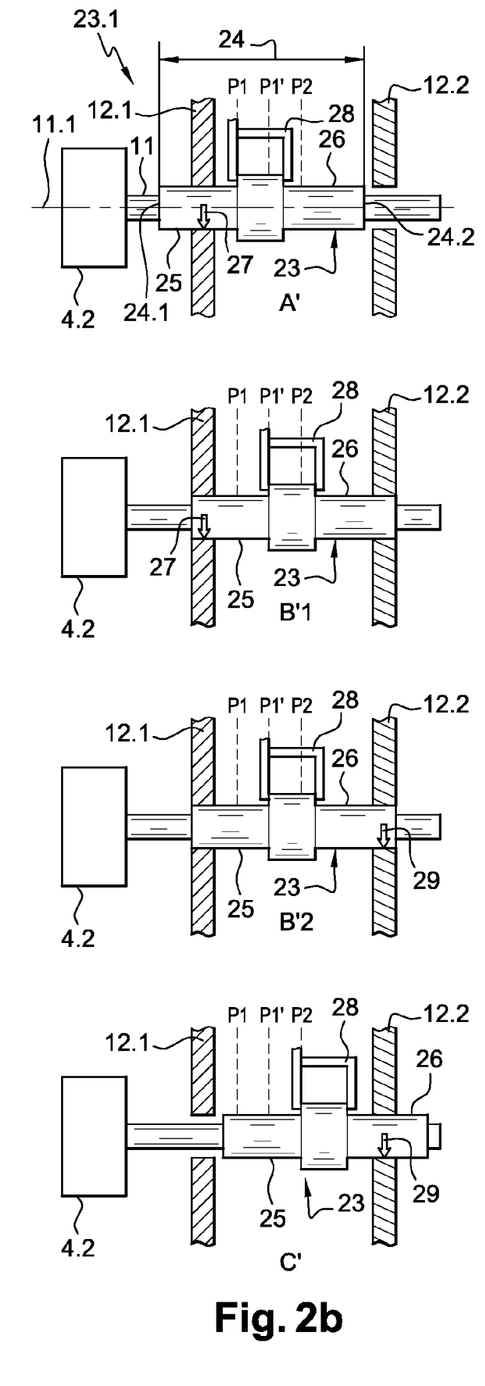
FIG. 2*b*-2*c*: schematic views of switching steps from one mode to another with switching devices according to the invention.

FIG. 2*b* is a schematic view of switching steps from one mode to another with a switching device 23.1 according to the invention. This switching device 23.1 has a sliding sleeve 23 and a fork 28.

The sliding sleeve 23 is a single block sliding sleeve. This sliding sleeve 23 is disposed between the first and the second gears 12.1, 12.2. As stated above, these gears 12.1 and 12.2 mesh with a first element of the second gear train 9 in direct engagement with the shaft 7 of the wheels 3 and with another element of this second gear train 9, respectively. The sliding sleeve 23 is driven in rotation by the shaft 11 and is mobile in translation along this shaft 11. As a variant, the gears 12.1 and 12.2 mesh with elements belonging to two different gear trains.

More precisely, the sliding sleeve 23 has a first extremity 25 and a second extremity 26. These extremities 25 and 26 are oriented axially with respect to axes of the gears 12.1 and 12.2. Preferably, an axis 11.1 of the shaft 11 of the second machine 4.2 is joined with the axes of the two gears 12.1 and 12.2, and of the sliding sleeve 23. The sliding sleeve 23 has a shuttle length 24 that extends between its most spaced apart radial extremities 24.1 and 24.2. This shuttle length is more than the distance separating the two gears 12.1 and 12.2.

The fork 28 is supported on two shoulders of this sliding sleeve 23. This fork 28 is controlled to move the sliding sleeve 23 in translation along the shaft 11. This fork 28 moves the sliding sleeve 23 from a first position P1 toward a second position P2 by passing through intermediary positions, in particular position P1'.

The conditions for this communication to occur are the same as those stated previously. One of these conditions corresponds to a rotation speed N1 zero of the first machine 4.1. In addition, a synchronism between the shaft 11 and the gears 12.1 and 12.2 must be observed during the switching. This synchronism is verified when the rotation speed of the gears 12.1 and 12.2 is equal to the rotation speed of the shaft 11.

In a first step A', the fork 28 is in the first position P1. The first extremity 25 of the sliding sleeve 23 is then in engagement with the first gear 12.1 connected to a second element of the second gear train 9. This first extremity 25 extends beyond the first gear 12.1. The second extremity 26 of the sliding sleeve 23 is not in engagement with any of the gears 12.1 and 12.2. A torque 27 is applied to the shaft 12.1 so that the second machine 4.2 can supply a power corresponding in particular to the losses of the machines 4.1 and 4.2.

In a second step B'1, the fork 28 moves the sliding sleeve 23 in to an intermediary position P1'. During this movement, the sliding sleeve 23 enters into cooperation with the second gear 12.2 without effort since the sliding sleeve 23 is supported on the first gear 12.1. In this second step B'1, the sliding sleeve is not supported on the second gear 12.2. The second extremity 26 of the sliding sleeve 23 has been able to penetrate inside the gear 12.2. by taking advantage of the plays that exist between this extremity 26 and the gear 12.2. At the end of the second step B'1, the two extremities 25 and 26 of the sliding sleeve 23 thus enter into cooperation with the two gears 12.1 and 12.2 simultaneously. And only the first extremity is supported on the first gear 12.1.

In a third step B'2, the fork 28 is still located on the intermediary position P1'. The extremities 25 and 26 of the sliding sleeve 23 still enter into cooperation with the first and the second gears 12.1, 12.2. In this step B'2, the support of the sliding sleeve is transferred from one gear to another. Indeed, in this third step B'2, the second extremity 26 is supported on the second gear 12.2, while the first extremity 25 is no longer supported on the first gear 12.1.

This transfer of support can be performed by slightly moving the sliding sleeve 23 in rotation 1 with the help of an actuator (not shown). More precisely, by moving the sliding sleeve 23 by the angular plays existing between it and the gears 12.1 and 12.2, the support of the sliding sleeve 23 is moved from one gear to the other. This transfer of support is performed preferably when the sliding sleeve 23 is located approximately half-way between the first and the second gears 12.1, 12.2.

In a fourth step C', the first extremity 25 of the sliding sleeve 23 is easily disengaged from the first gear 12.1, since this extremity 25 is no longer supported on the first gear 12.1. The second extremity 26 is then the only one engaged with the second gear 12.2 connected to an element of the second epicycloidal gear train 9. A torque 29 is then applied to the shaft 11 via the second gear 12.1. Thus, the step B of the state of the art has been replaced by two steps B'1 and B'2. During these steps B'1 and B'2, the sliding sleeve 23 is in engagement with the two gears 12.1 and 12.2 simultaneously and transfers its support on the shaft 11 from one gear to the other.

As a consequence, in all the steps of the switching, a torque is applied to the shaft 11 of the second machine 4.2 via the sliding sleeve 23. The second machine 4.2 can thus always produce a power corresponding to the losses of the machines 4.1 and 4.2. In addition, the torque applied to the shaft 11 of the second machine 4.2, when the latter behaves as a generator, can always be applied to the torque 7 of the wheels 3 of the vehicle. Indeed, this torque is applied via the first or the second gear 12.1, 12.2.

As shown on FIG. 1, the power transmission device according to the invention comprises in addition a driving device 10. This driving device 10 comprises a microprocessor 10.1, a program memory 10.2 and a data memory 10.3. The program memory 10.2 comprises programs P1-PN and the data memory 10.3 comprises data D1-DN. The driving device 10 also comprises an input-output interface 10.4. This input-output interface 10.4 receives signals M1-MN stemming from sensors (not shown) and emits in particular control signals 01-02 toward the machines 4.1, 4.2. Outputs of sensors measuring the rotation speed and the torque of the machines 4.1, 4.2 are in particular connected to inputs of the interface 10.4.

The displacement of the fork 28 is, for example, performed via a low-power, direct current motor (not shown). When the driving device 10 detects values of speed and torque corresponding to switching conditions, the microprocessor 10.1 can perform a program P1. As a performance of this program P1, the driving device 10 emits a signal O3 toward the direct current motor during the switching from one mode to the other. This signal O3 controls the rotation of this motor.

Preferably, the sliding sleeve 23 moves in a continuous manner, i.e., during the whole switching, the sliding sleeve 23 is still in movement.

Of course, the switching is reversible, the sliding sleeve 23 being able to move from the second gear 12.2 toward the first gear 12.1.

Figure 2C:
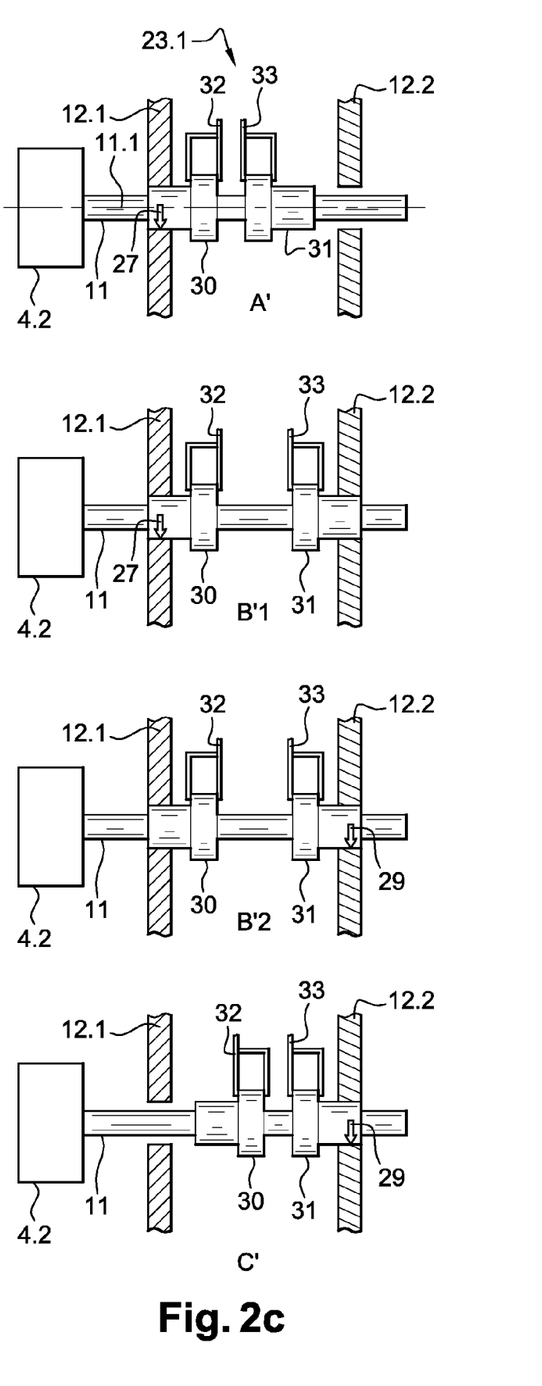

FIG. 2c shows a variant embodiment of the switching device 23.1 according to the invention. Contrary to the sliding sleeve of FIG. 2b, which is made in a single part, in this variant, the sliding sleeve 23 has a first portion 30 and a second portion 31. These two portions 30 and 31 are disposed in a space separating the two gears 12.1 and 12.2 and are oriented in an axial manner with respect to an axis of the shaft 11 of the second machine 4.2.

These two portions 30 and 31 are driven in rotation by the shaft 11. These two portions 30 and 31 can move independently one from the other, in translation along the shaft 11 of the second machine 4.2. Each of the portions 30 and 31 is driven in translation by a fork 32, 33. The forks 32, 33 ensure the movement of a portion of the sliding sleeve 23 from an engaged position toward a disengaged position, and reciprocally. In the engaged position, the portion of the sliding sleeve 23 is engaged inside a gear that corresponds thereto. In the disengaged position, the portion is disengaged from the gear that corresponds thereto.

Thus, in the first step A', the first portion 30 is in the engaged position, whereas the second portion 31 is located in a disengaged position. The torque 27 is then applied to the shaft 11 via this first portion 30.

In the second step B'1, the second portion 31 comes into engagement without effort in the second gear 12.2, since no torque is applied on this second portion 31. Indeed, the torque 27 is still applied to the shaft 11 of the second machine 4.2 via the first portion 30. The extremities of the two portions 30 and 31 oriented radially with respect to the axis 11.1 are then separated by a distance that is more than that separating the two gears 12.1 and 12.2. Said differently, these two portions 30 and 31 can move over a distance of more than that separating the two gears 12.1 and 12.2.

In a third step B'2, by playing here again with the angular plays that exist between the portions 30 and 31 of the sliding sleeve 23 and the gears 12.1 and 12.2, a support of the sliding sleeve 23 is transferred onto the shaft 11 from the first to the second portion. The torque 29 is then applied to the shaft 11 via the second portion 31. To transfer the torque, the portions 30 and 31 of the sliding sleeve 23 are set in rotation by a few tens of degrees, with the help of an actuator. This actuator can be formed in particular by the machines 4.1 and 4.2 that then receive an adjustment of their controls.

In a fourth step C', the first portion 30 becomes disengaged from the first gear 12.1. The second portion 31 is then in engagement with the second gear 12.2, while the first portion 30 is no longer in engagement with the first gear 12.1. It has been possible to perform this disengagement of the first portion 31 without effort, since the shaft 11 is supported on the second portion 31.

Since the shaft 11 is still driven by one of the two gear 12.1, 12.2, a power corresponding to the losses of the machines 4.1 and 4.2 can still be produced by the second machine 4.2. And, in the case where the second machine 4.2 operates as in generator mode during the switching, a torque of this second machine 4.2 is applied in a continuous manner to the shaft 7 of the wheels of the vehicle.

The two portions 30 and 31 being distinct one from the other, the sliding sleeve 23 is very easy to move from one step to another. Indeed, in this embodiment, portions of the sliding sleeve 23 are moved that are never supported on one of the gear 12.1 or 12.2. In this embodiment, no effort is applied onto the displaced portions.

Here also, the forks 32 and 33 can be driven by direct current motors controlled by the driving device 10. As a variant, only one of the forks 32, 33 is driven by a motor. The other fork is then connected thereto.

Of course, in this embodiment also, the switching is reversible. Indeed, the sliding sleeve 23 can shift from being engaged with the second gear 12.2 to being engaged with the first gear 12.1.

As a variant, the two portions 30 and 31 of the sliding sleeve 23 are located outside of the space separating the two gears 12.1 and 12.2.

Figure 3A:
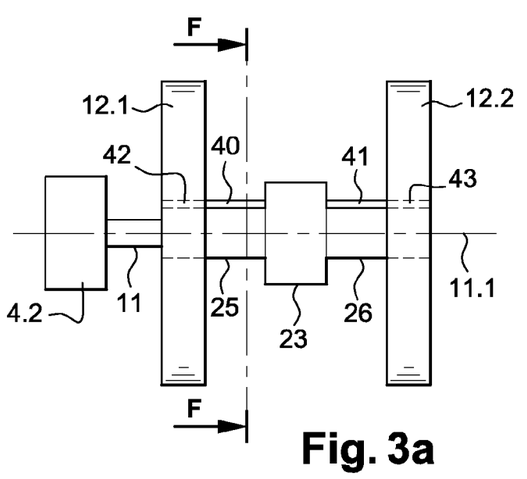
FIGS. 3*a*-3*b*: side and front views of a switching device according to the invention.

FIG. 3a shows in particular a side view of a single block sliding sleeve 23 according to the invention. Preferably, this sliding sleeve 23 has tongues 40 and 41 that extend over the whole length of the extremities 25 and 26, respectively. These tongues 40 and 41 are oriented in an axial manner with respect to the axis 11.1 of the shaft 11.

The gears 12.1 and 12.2 have grooves 42 and 43 that extend along an axis of these gears 12.1, 12.2. Preferably, this axis is joined with the axis 11.1. The grooves 42 and 43 extend over the whole thickness of these gears, over a periphery of holes of these gears 12.1 and 12.2. These grooves 42 and 43 whose shape is complementary to that of the tongues 40 and 41 are intended to receive these tongues 40 and 41. Thus, when the sliding sleeve 23 comes into engagement inside one of the gears 12.1 or 12.2, the sliding sleeve 23 drives this gear in rotation.

When the sliding sleeve 23 is made in two portions 30 and 31, each portion has a tongue intended to slide in the groove of the gear that corresponds thereto. Each of the portions 30 and 31 can then drive in rotation the gear that corresponds thereto.

Figure 3B:
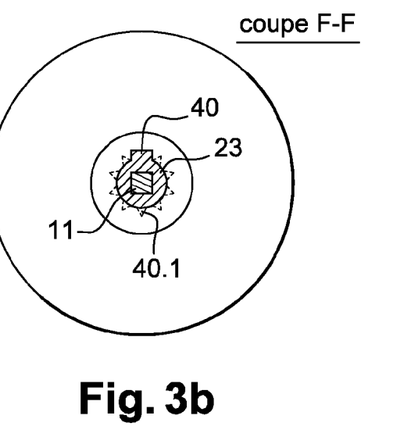

FIG. 3b shows a cross-section view F.F of the sliding sleeve 23 according to the invention. In a particular embodiment, the shaft 11 has a rectangular shape. This shaft 11 then enters into cooperation with a rectangular-shaped cavity of the sliding sleeve. Thus, the sliding sleeve 23 is capable of moving in translation along the shaft 11 and of being driven in rotation by this shaft 11.

As a variant, in addition to the tongues 40 and 41, the sliding sleeve 23 has teeth 40.1 whose shape is complementary to that of the holes of the gears 12.1 and 12.2. As a variant, the sliding sleeve 23 has only teeth.

Figure 4:
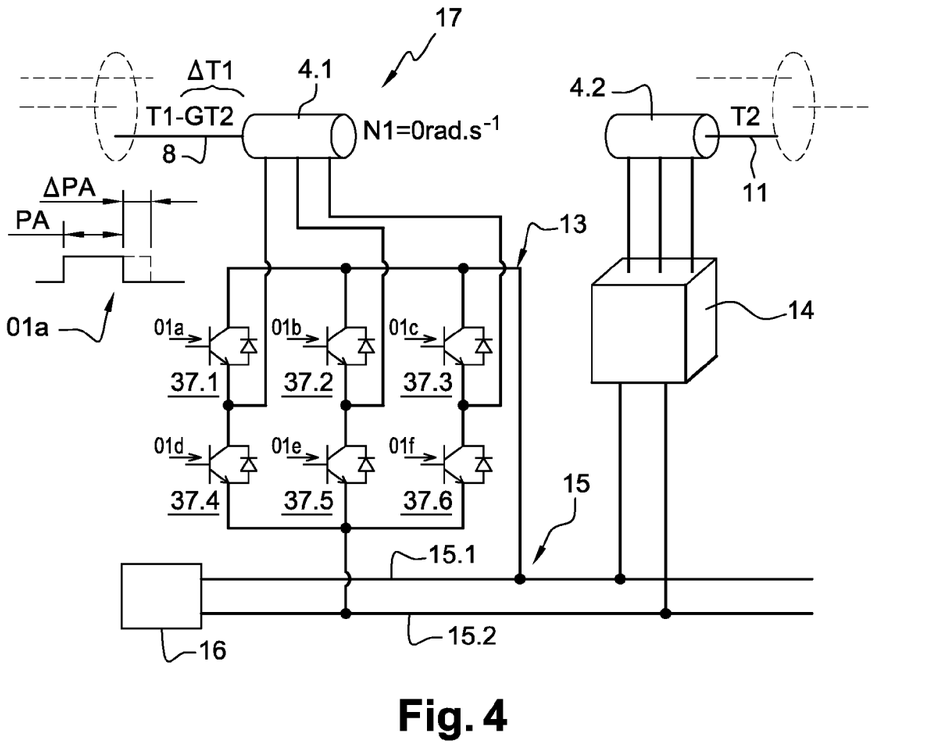
FIG. 4: a schematic view of an electrical chain according to the invention and of its control signals, during a switching between two modes, when one of the machines operates as a generator.

FIG. 4 shows an electrical chain 17 of a transmission device according to the invention. The inverter 13 of the second machine 4.2 is controlled so as to compensate a parasitic torque applied to the shaft 8 of the first machine 4.1. As will be seen, this parasitic torque can be observed when the second machine 4.2 operates as a generator at the time of a switching from one mode to another. During this switching, the second machine 4.2 supplies energy to the storage system 18 connected to the bus 15.

More precisely, the inverter 13 has six switches 37.1-37.6. Each switch 37.1-37.6 is formed by a transistor, for example, of the IGBT type, and of a diode. To hash a tension, the switches 37.1 37.6 can be, for example, closed two by two. For example, when the first transistor 37.1 is open, the fifth transistor 37.5 is also open. A current can then be established by passing through a positive connection 15.1 of the bus 15, then through a first switch 37.1, then through a phase of the first machine 4.1 connected between the switches 37.1 and 37.5, then through the fifth switch 37.5, to then return to a negative connection of the bus 15.

The diodes of the switches 37.1-37.6 ensure in particular a role of freewheel diodes when the inverter 13 operates as a hasher and the first machine 4.1 behaves as a motor. These diodes also form a diode bridge rectifying an alternative tension signal supplied by the first machine 4.1, when this machine behaves as a generator.

When the second machine 4.2 supplies electrical energy to the storage system 18, a torque T2 is applied to the shaft 11 of the second machine 4.2.

A portion of this torque T2 is transmitted to the shaft of the first machine 4.1 via elements of the epicycloidal gear trains 5 and 9. The torque T1 usually applied to the shaft of the first machine 4.1 at the time of a switching (see equation 10) is then substituted by a torque T1−GT2. The torque having a value −GT2 corresponding to the parasitic torque, could generate a racing of the first machine 4.1 at the time of this switching.

A compensation torque, having a value +G.T2, must thus be applied to the shaft 8 of the first machine 4.1, so as to maintain its rotation speed at zero during the switching. This compensation torque compensates the parasitic torque having a value −GT2 applied to the shaft 8 of the first machine 4.1.

To apply this compensation torque +G.T2, the duration of the control signals applied to bases of the transistors of the switches 37.1-37.6 can be increased. These transistors modify currents that pass through coils of the first machine 4.1. And these currents modify the torque applied to the shaft 8 of the first machine 4.1. In an example, the duration PA of the control signals is increased by a duration ΔPA corresponding to the torque G.T2.

In an embodiment, the data memory 10.3 contains a datum D1 corresponding to the coefficient G. The microprocessor 10.1 can thus acquire through the interface 10.4 a signal M2 corresponding to a value of the torque T2 applied to the shaft 11 of the second machine 4.2.

This signal M2 can in particular be acquired with the help of a torque sensor disposed on the shaft of the second machine 4.2. The driving device 10 sends control signals 01a-01f that control the switching of the switches 37.1-37.6. These signals 01a-01f make it possible to compensate the torque applied to the shaft 8 of the first machine 4.1, by generating the application of a torque having a value +GT2 to this shaft. The microprocessor 10.1 will then be able to calculate the duration ΔPA by which the signals 01a-01f need to be lengthened so that a compensation torque having a value +GT2 compensates exactly the parasitic torque generated by the second machine 4.2.

Figure 5:
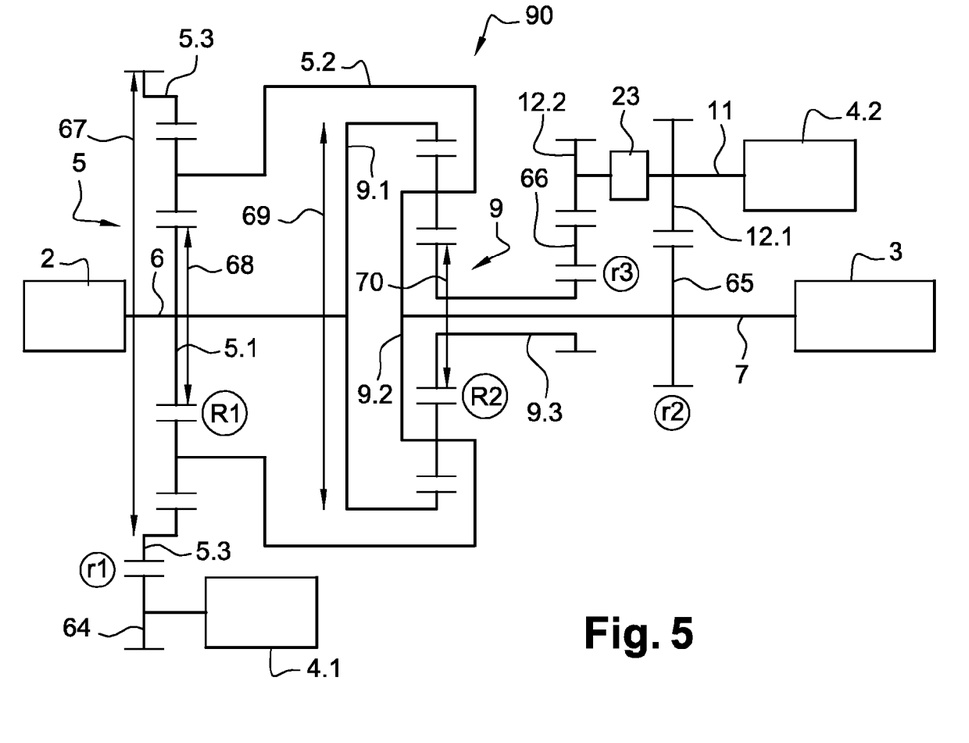
FIG. 5: a schematic view of a mechanical chain of a power transmission device according to the invention.

FIG. 5 shows an embodiment of a transmission device according to the invention. For more clarity, the electrical path 17 connecting the two machines 4.1 and 4.2 is not shown on this Figure. In this embodiment, the mechanical assembly 90 is formed by the two gear trains 5 and 9. The first element 5.1 of the first gear train 5 corresponds here to a sun gear, the second element 5.2 of the first gear train 5 corresponds to a planet carrier, and the third element 5.3 of the first gear train 5 corresponds to a ring gear. Further, the first element 9.1 of the second gear train 9 corresponds to a ring gear, the second element 9.2 of the second gear train 9 corresponds to a planet carrier, and the third element 9.3 of the second gear train 9 corresponds to a sun gear.

More precisely, the shaft 6 of the heat engine 2 is connected to the sun gear 5.1 of the first gear train 5. The shaft 8 of the first machine 4.1 is connected to the ring gear 5.3 of the first gear train 5 via a first wheel 64.

The planet carrier 5.2 of the first gear train 5 is connected to the planet carrier 9.2 of the second gear train 9. And the sun gear 5.1 of the first gear train 5 is connected to the ring gear 9.1 of the second gear train 9. By connecting in this way the two gear trains 5 and 9, the number of degrees of freedom of these two gear trains is limited to four. Thus, the rotational movements of the shafts of the two machines 4.1 and 4.2, of the shaft 6 of the engine 2, and of the shaft 7 of the wheels 3 with respect to each other are ensured.

The shaft 7 of the wheels 3 is directly connected to the planet carrier 9.3 of the second gear train 9. This shaft 7 is capable of being connected to the first gear 12.1 via a second wheel 65. The sun gear 9.3 of the second gear train 9 is capable of being connected to the second gear 12.2 via a third wheel 66.

The sliding sleeve 23 according to the invention is driven in rotation by the shaft 11. In the first embodiment, the sliding sleeve 23 according to the invention cooperates with the first gear 12.1. In the second embodiment, the sliding sleeve 23 cooperates with the second gear 12.2. In the first embodiment, the output shaft 11 of the second machine 4.2 is thus connected to the planet carrier 9.2 of the second gear train 9 which is in direct engagement with the shaft 7 of the wheels 3. In the second embodiment, the output shaft 11 of the second machine 4.2 is thus connected to the sun gear 9.3 of the second gear train 9.

The gear ratio of an epicycloidal gear train corresponds to a ratio between the diameter of its ring gear and the diameter of its sun gear. The gear ratio R1 of the first gear train 5 thus corresponds to the ratio between the diameter 67 of the ring gear 5.3 and the diameter 68 of the sun gear 5.1. The gear ratio R2 of the second gear train 9 thus corresponds to the ratio between the diameter 69 of the ring gear 9.1 and the diameter 70 of the sun gear 9.3. A first ratio r1 corresponds to a ratio between the diameter of the wheel 64 and the diameter 67 of the ring gear 9.1. A second ratio r2 corresponds to a ratio between the diameter of the first gears 12.1 and the diameter of the wheel 65. A third ratio r3 corresponds to a ratio between the rotation speed of the second gear 12.2 and the rotation speed of the sun gear 9.3 of the second gear train 9.

In an embodiment, the gear ratio R1 of the first gear train 5 has the value 2.3 and the gear ratio R2 of the second gear train 9 has the value 3.789. The first ratio r1 then has the value −0.45. The second ratio r2 has the value −0.23. And the third ratio r3 is +1.18. The sign − indicates that the wheels rotate in opposite directions from each other.

As a variant, the shafts of the machines 4.1 and 4.2, the shaft 7 of the wheels 3, and the shaft 6 of the heat engine 2 are connected one with the other via other elements of the gear trains 5 and 9, or via more than two gear trains. One of the constraints imposed to the mechanical assembly 90 formed by the epicycloidal gear trains is to have four degrees of freedom, one for each shaft.

The invention claimed is:

1. Power transmission device between a heat engine and wheels of a motor vehicle, this device having
   a first and a second electrical machine, and
   a mechanical group connecting with each other a shaft of the engine, a shaft of the wheels, and shafts of the electrical machines, this mechanical group having
      at least two epicycloidal gear trains, each epicycloidal gear train having several elements mutually engaged with gear shafts, and
      at least one switching device ensuring, by displacement, a selective connection of one of the shafts with a first element or a second element of the mechanical group to which this shaft is capable of being connected,
   wherein
   the switching device has means for simultaneously ensuring a connection between the selectively connected shaft and the two elements of the mechanical group, during a displacement of this switching device.

2. Device according to claim 1 wherein
   the two elements belong to a same epicycloidal gear train.

3. Device according to claim 1, wherein
   the selectively connected shaft is the shaft of one of the electrical machines.

4. Device according to claim 1, wherein
   the first element is directly connected to the shaft of the wheels.

5. Device according to claim 1, wherein
   the switching device has a single block sliding sleeve having a shuttle length of more than the distance that separates a first gear connected to one of the two elements for a second gear connected to the other element.

6. Device according to claim 1, wherein
   the switching device has a sliding sleeve made of two portions,
   a first portion being intended enter into cooperation with a first gear connected to one of the two elements,
   a second portion being intended to enter into cooperation with a second gear connected to the other element.

7. Device according to claim 6 wherein
   the first and the second portions move independently from each other over a distance of more than that separating the first and the second gears.

8. Device according to claim 5, wherein the sliding sleeve has a tongue and/or teeth intended to cooperate with a groove and/or teeth made in a periphery of holes of the gears.

9. Device according to claim 1, which has a driving device controlling the two machines and the switching device, to compensate a torque applied to the shaft of the other machine during a switching.

10. Device according to claim 1, which comprises a storage system connected to the machines via a direct tension bus.

11. Device according to claim 1, wherein
the epicycloidal gear trains have gear ratios selected so that when the rotation speeds of the two elements are equal, the rotation speed of the shaft of the other machine is zero.

12. Method of using a power transmission device between a heat engine and wheels of a motor vehicle, this power transmission device having a first and a second electrical machine, a switching device, and a mechanical group connecting with each other a shaft of the engine, a shaft of the wheels, and shafts of the electrical machines, this mechanical group having at least two epicycloidal gear trains, each gear train having several elements mutually meshing with gear shafts, having,
in a first operating mode, connecting a shaft of a machine to an element of the mechanical group with the help of a sliding sleeve of the switching device, and
in a second operating mode, connecting the shaft of this same machine to another element of the mechanical group with the help of the sliding sleeve,
said method including
if the machine does not operate as a motor during the passage from one mode to another, applying a torque to the shaft of the other machine to compensate the presence of a parasitic torque on this shaft.

13. Method according to claim 12 including
during the passage from one mode to another, to compensate, connecting simultaneously the shaft of the machine with the two elements of the mechanical group to which this shaft is capable of being connected, with the help of the sliding sleeve.

14. Method according to claim 13 wherein, during the passage from one mode to another,
the sliding sleeve is supported on a gear connected to one of the elements then on a second gear connected to the other element.

15. Method according to claim 12, including, to compensate the torque,
emitting control signals on transistors of an inverter connected to the other machine during an increased duration.

16. Method according to claim 12, including, to compensate,
applying a torque to the shaft of the other machine corresponding to a torque applied to the shaft of the machine multiplied by a known coefficient.

* * * * *